United States Patent
Alcorn et al.

(10) Patent No.: US 10,146,623 B2
(45) Date of Patent: Dec. 4, 2018

(54) INDICATING REBUILD STATE OF STORAGE DEVICES

(71) Applicant: Hewlett-Packard Development Company, L.P., Houston, TX (US)

(72) Inventors: Byron A. Alcorn, Fort Collins, CO (US); Bruce Trevino, Spring, TX (US); Scotty M. Wiginton, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 75 days.

(21) Appl. No.: 15/035,483

(22) PCT Filed: Nov. 18, 2013

(86) PCT No.: PCT/US2013/070549
§ 371 (c)(1),
(2) Date: May 9, 2016

(87) PCT Pub. No.: WO2015/073042
PCT Pub. Date: May 21, 2015

(65) Prior Publication Data
US 2016/0292035 A1    Oct. 6, 2016

(51) Int. Cl.
*G06F 11/00* (2006.01)
*G06F 11/10* (2006.01)
*G06F 11/32* (2006.01)
*G06F 9/4401* (2018.01)
*G06F 11/22* (2006.01)
(Continued)

(52) U.S. Cl.
CPC ........ *G06F 11/1092* (2013.01); *G06F 9/4411* (2013.01); *G06F 11/0727* (2013.01); *G06F 11/0757* (2013.01); *G06F 11/2284* (2013.01); *G06F 11/328* (2013.01); *G06F 11/1417* (2013.01)

(58) Field of Classification Search
CPC .................................................... G06F 11/1092
USPC .... 714/6.22, 6.1, 6.11, 6.12, 6.13, 6.2, 6.21, 714/6.23, 6.32
See application file for complete search history.

(56) References Cited

U.S. PATENT DOCUMENTS

| | | | |
|---|---|---|---|
| 6,393,586 B1 | 5/2002 | Sloan et al. | |
| 9,170,938 B1 * | 10/2015 | Walsh | G06F 12/0246 |

(Continued)

FOREIGN PATENT DOCUMENTS

| | | |
|---|---|---|
| CN | 101719103 | 6/2010 |
| CN | 101930404 A | 12/2010 |

(Continued)

OTHER PUBLICATIONS

"PS3 Safe Mode Information"; 2007, 2 pages, http://faq.en.playstation.com/app/answers/detail/a_id/4545/~/ps3-safe-mode-information.
(Continued)

*Primary Examiner* — Dieu Minh T Le
(74) *Attorney, Agent, or Firm* — Trop, Pruner & Hu PC

(57) ABSTRACT

Example implementations relate to obtaining information about and indicating a state of a storage device. In example implementations, an indication that a storage device is rebuilding address mappings may be received, and how much progress has been made in the rebuilding may be determined. A representation of the progress made in the rebuilding may be displayed.

15 Claims, 10 Drawing Sheets

(51) Int. Cl.
*G06F 11/07* (2006.01)
*G06F 11/14* (2006.01)

(56) References Cited

U.S. PATENT DOCUMENTS

| | | | |
|---|---|---|---|
| 9,329,995 B2* | 5/2016 | Chen | G06F 12/0246 |
| 2002/0180795 A1 | 12/2002 | Wright | |
| 2005/0223156 A1* | 10/2005 | Lubbers | G06F 3/0619 |
| | | | 711/100 |
| 2006/0242371 A1 | 10/2006 | Shono et al. | |
| 2008/0022163 A1 | 1/2008 | Tanaka et al. | |
| 2009/0089610 A1 | 4/2009 | Rogers et al. | |
| 2009/0172273 A1* | 7/2009 | Piszczek | G06F 11/1092 |
| | | | 711/114 |
| 2011/0022888 A1 | 1/2011 | Hama | |
| 2011/0029742 A1 | 2/2011 | Grube et al. | |
| 2011/0138222 A1* | 6/2011 | Haines | G06F 11/1048 |
| | | | 714/6.12 |
| 2011/0185164 A1* | 7/2011 | Okano | G06F 11/0757 |
| | | | 713/2 |
| 2012/0054419 A1* | 3/2012 | Chen | G06F 11/1441 |
| | | | 711/103 |
| 2013/0031349 A1* | 1/2013 | Grube | G06F 9/4401 |
| | | | 713/2 |

FOREIGN PATENT DOCUMENTS

| | | |
|---|---|---|
| CN | 103064641 A | 4/2013 |
| CN | 103246480 | 8/2013 |

OTHER PUBLICATIONS

Henderson, M., "Startup disk recovery and repair—lessons learned", Jun. 22, 2010, 12 pages.
Viking Technology, "2.5" Element SSD", Jun. 27, 2013, 59 pages.

* cited by examiner

INDICATING REBUILD STATE OF STORAGE DEVICES

CROSS-REFERENCE TO RELATED APPLICATION

This application is a U.S. National Stage Application of and claims priority to International Patent Application No. PCT/US2013/070549, filed on Nov. 18, 2013, and entitled "INDICATING REBUILD STATE OF STORAGE DEVICES," which is hereby incorporated by reference in its entirety.

BACKGROUND

During a boot-up process of a user device, a Basic Input/Output System (BIOS) of the user device may discover what drives are attached to the user device. The BIOS may send commands to each drive to send information about itself (e.g., model name, serial number, storage capacity). Based on the information it receives from the drives, the BIOS may enable power management or security operations for the drives.

BRIEF DESCRIPTION OF THE DRAWINGS

The following detailed description references the drawings, wherein.

DETAILED DESCRIPTION

Figure 1:
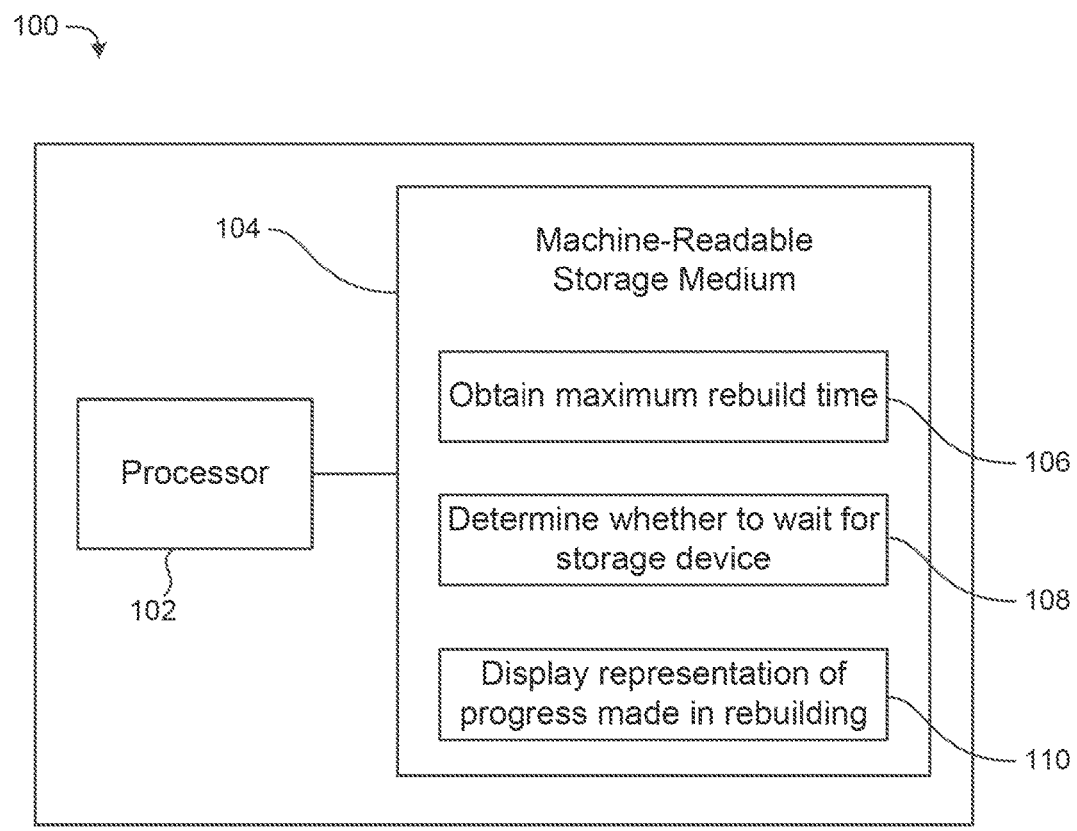
FIG. 1 is a block diagram of an example user device that includes a machine-readable storage medium encoded with instructions that enable indicating a rebuild state of a storage device.

As discussed above, a Basic Input/Output System (BIOS) of a user device may receive information from various drives during a boot-up process of the user device. The term "user device" as used herein refers to a device capable of receiving input from a user, accessing stored data, and/or displaying information to a user. Drives may be built into or communicatively coupled (e.g., via a Universal Serial Bus [USB] cable) to a user device, and may include storage devices. The term "storage device" as used herein refers to a device suitable for storing data and/or executable instructions, and for storing metadata to track mappings of logical block addresses (LBAs) to physical addresses where the data/instructions are stored. The term "mapping", as used herein with respect to addresses, refers to information indicative of a relationship between two addresses that refer to the same location in a storage device. Examples of storage devices may include a solid-state drive (SSD), a hard disk drive (HDD), a solid-state hybrid drive (SSHD), and a shingled magnetic recording (SMR) hard drive.

A storage device may maintain, in a random-access memory (RAM), a look-up table of logical-to-physical address mappings. Mappings may change over the life of a storage device as data is written to and deleted from the storage device. If power is unexpectedly removed from a storage device (e.g., during a "dirty" shutdown of the storage device), the address mappings may be lost, but metadata indicative of which logical and physical addresses are mapped to one another may be retained in the storage device. When power is restored to the storage device, the address mappings may be reconstructed using the mapping metadata in the storage device. The process of reconstructing address mappings using mapping metadata, or the performance of such a process, may be referred to herein as "rebuilding address mappings", or simply "rebuilding". The period during which a storage device is rebuilding address mappings may be referred to herein as a "rebuild state".

While a storage device is in a rebuild state, a user device may not be able to access the instructions/data stored in the storage device. In current systems, if a user device that contains or that is communicatively coupled to a storage device runs power-on self-test (POST) while the storage device is in a rebuild state, the user device may merely receive, from the storage device, an indication that the storage device is not available or not ready for use. The user device may attempt to search for other storage devices, and if none are available for use, the user device may display a "disk error" message to a user of the user device. An unavailable storage device that is rebuilding may become available once the rebuilding is complete, but a conventional BIOS may not be able to distinguish a rebuilding storage device from a storage device that is permanently unavailable (e.g., because of a fatal error), and thus a "disk error" message in current systems may not inform users of the cause of the error. A "disk error" message may be temporarily displayed on a user device while a storage device is rebuilding, but a user may mistakenly think the "disk error" message means that the user device is permanently unusable. The user may not know that he should wait for the rebuilding to finish, and may instead return the user device to the seller or manufacturer thinking that the user device is defective.

The present disclosure addresses these issues by enabling a BIOS of a user device to obtain, from a storage device, information regarding whether the storage device is in a rebuild state and, if the storage device is rebuilding, how much progress has been made in the rebuilding. The BIOS may use such information to indicate to a user that the storage device is rebuilding, rather than just telling the user that there is a disk error. Thus, the user may know to wait for the storage device to finish rebuilding before trying to use the user device, rather than mistakenly concluding that the user device is permanently unusable.

Referring now to the drawings, FIG. 1 is a block diagram of an example user device 100 that includes a machine-readable storage medium encoded with instructions that enable indicating a rebuild state of a storage device. As used herein, the terms "include", "have", and "comprise" are interchangeable and should be understood to have the same meaning. User device 100 may be a notebook computer, a desktop computer, a workstation, a tablet computing device, a mobile phone, or an electronic book reader. In some implementations, user device 100 may operate as and/or be part of a server. In FIG. 1, user device 100 includes processor 102 and machine-readable storage medium 104.

Processor 102 may include a central processing unit (CPU), microprocessor (e.g., semiconductor-based microprocessor), and/or other hardware device suitable for retrieval and/or execution of instructions stored in machine-readable storage medium 104. Processor 102 may fetch, decode, and/or execute instructions 106, 108, and 110 to enable indicating a rebuild state of a storage device in or communicatively coupled to user device 100, as described below. As an alternative or in addition to retrieving and/or executing instructions, processor 102 may include an electronic circuit comprising a number of electronic components for performing the functionality of instructions 106, 108, and/or 110.

Machine-readable storage medium 104 may be any suitable electronic, magnetic, optical, or other physical memory that contains or stores executable instructions. Thus, machine-readable storage medium 104 may include, for example, a RAM, an EEPROM, a storage device, an optical disc, and the like. In some implementations, machine-readable storage medium 104 may include a non-transitory storage medium, where the term "non-transitory" does not encompass transitory propagating signals. As described in detail below, machine-readable storage medium 104 may be encoded with a set of executable instructions 106, 108, and 110.

Instructions 106 may obtain a maximum rebuild time of a storage device. The maximum rebuild time may be the maximum amount of time that a storage device will take to finish rebuilding address mappings. In some implementations, the maximum rebuild time may be obtained from a storage device while the storage device is rebuilding. For example, when a storage device is in a rebuild state, the storage device may respond to a command (e.g., from a BIOS of a user device) to identify itself even though the storage device may not respond to requests to access stored data. The storage device may transmit its maximum rebuild time along with self-identification information (e.g., device type, storage capacity) in response to an identification command. The maximum rebuild time may be stored with executable instructions (e.g., firmware) in a part of a storage device that is separate from where mapping metadata is stored, and thus the maximum rebuild time may be accessed and transmitted without interfering with the usage of the mapping metadata to rebuild address mappings.

In some implementations, a storage device may not respond to an identification command while the storage device is rebuilding. A maximum rebuild time may be obtained from the storage device while the storage device is not rebuilding (e.g., during normal operation of the storage device, a BIOS of a user device may send a command to the storage device to transmit a maximum rebuild time). The maximum rebuild time may be stored in a non-volatile memory of a user device and may be retrieved whether or not the storage device is available. Thus, the maximum rebuild time may be obtained while the storage device is rebuilding, even if the storage device does not respond to any commands while in a rebuild state.

Instructions 108 may determine, based on a maximum rebuild time, and while a storage device is rebuilding address mappings, whether to wait for the storage device to finish rebuilding. For example, if the storage device is rebuilding during POST of user device 100, processor 102 may keep track of how long the storage device has been rebuilding address mappings. If the time spent rebuilding address mappings does not exceed the maximum rebuild time, instructions 108 may determine to wait for the storage device to finish rebuilding, and POST may be suspended. If the time spent rebuilding address mappings exceeds the maximum rebuild time, instructions 108 may determine not to wait for the storage device to finish rebuilding, and POST may continue even though the storage device is still rebuilding.

Instructions 110 may display, if a decision is made to wait for a storage device to finish rebuilding, a representation of progress made in the rebuilding. The representation of progress may be graphical, textual, or a combination thereof. In some implementations, the representation of progress may include a horizontal or vertical bar, or a circle, that is shaded based on what percentage of the rebuilding is complete. In some implementations, a number corresponding to the percentage of the rebuilding that is complete may be displayed instead of or in addition to a graphical representation of progress. A textual message may also be displayed to inform a user of user device 100 that rebuilding is in progress.

Figure 2:
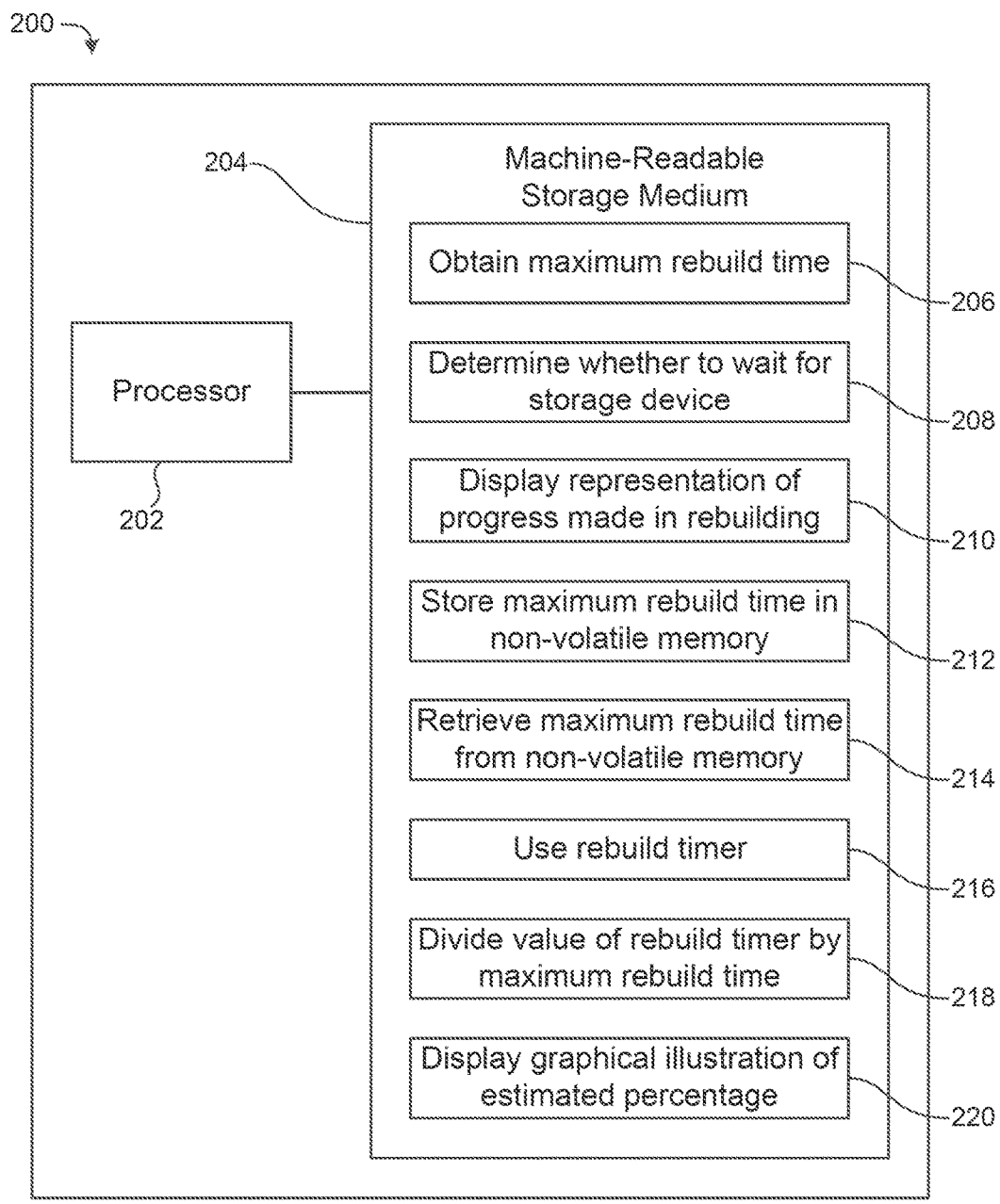
FIG. 2 is a block diagram of an example user device that includes a machine-readable storage medium encoded with instructions that enable estimation of a rebuild completion percentage of a storage device.

FIG. 2 is a block diagram of an example user device 200 that includes a machine-readable storage medium encoded with instructions that enable estimation of a rebuild completion percentage of a storage device. The term "completion percentage" as used herein refers to a value indicative of what percentage of a rebuilding process in a storage device is complete. User device 200 may be a notebook computer, a desktop computer, a workstation, a tablet computing device, a mobile phone, or an electronic book reader. In some implementations, user device 200 may operate as and/or be part of a server. In FIG. 2, user device 200 includes processor 202 and machine-readable storage medium 204.

As with processor 102 of FIG. 1, processor 202 may include a CPU, microprocessor (e.g., semiconductor-based microprocessor), and/or other hardware device suitable for retrieval and/or execution of instructions stored in machine-readable storage medium 204. Processor 202 may fetch, decode, and/or execute instructions 206, 208, 210, 212, 214, 216, 218, and 220 to enable estimation of a rebuild completion percentage of a storage device in or communicatively coupled to user device 200, as described below. As an alternative or in addition to retrieving and/or executing instructions, processor 202 may include an electronic circuit comprising a number of electronic components for performing the functionality of instructions 206, 208, 210, 212, 214, 216, 218, and/or 220.

As with machine-readable storage medium 104 of FIG. 1, machine-readable storage medium 204 may be any suitable physical memory that stores executable instructions. Instructions 206, 208, and 210 on machine-readable storage medium 204 may be analogous to (e.g., have functions and/or components similar to) instructions 106, 108, and 110 on machine-readable storage medium 104. Instructions 212 may store a maximum rebuild time in a non-volatile memory. The maximum rebuild time may be the maximum amount of time that a storage device that is part of or communicatively coupled to user device 200 will take to finish rebuilding address mappings. The non-volatile memory may be part of user device 200, and may be accessible regardless of whether the storage device is available to user device 200. It should be understood that user device 200 may include and/or be communicatively coupled to multiple storage devices, and that a maximum rebuild time for each of the multiple storage devices may be stored in a non-volatile memory. It should also be understood that user device 200 may access multiple non-volatile memories, and that maximum rebuild times for different storage devices may be stored in different non-volatile memories.

Instructions 214 may retrieve a maximum rebuild time from a non-volatile memory. The retrieved maximum rebuild time may have been received from a storage device that is part of or communicatively coupled to user device 200. The storage device may be rebuilding during POST of user device 200. While rebuilding, the storage device may not respond to any commands from a BIOS of user device 200.

Instructions 216 may use a rebuild timer to keep track of how long a storage device has been rebuilding address mappings. Instructions 216 may start the rebuild timer after determining that the storage device is not available and retrieving the maximum rebuild time for the storage device. The rebuild timer may run until the maximum rebuild time is reached, or until the storage device is finished rebuilding, whichever comes first.

Instructions 218 may divide a value of the rebuild timer by the retrieved maximum rebuild time. The result of the dividing may be used to estimate what percentage of the rebuilding has been completed. Such an estimate may be made in implementations where the storage device does not respond to commands while rebuilding, since user device 200 may not be able to obtain information about rebuilding progress from the storage device while the storage device is in a rebuild state.

Instructions 220 may display a graphical illustration of the estimated percentage. The graphical illustration may include a horizontal or vertical bar, or a circle. A percentage of the bar or circle may be shaded, corresponding to the estimated percentage of the rebuilding that is complete. In some implementations, a number corresponding to the estimated percentage may be displayed with the graphical illustration.

Figure 3:
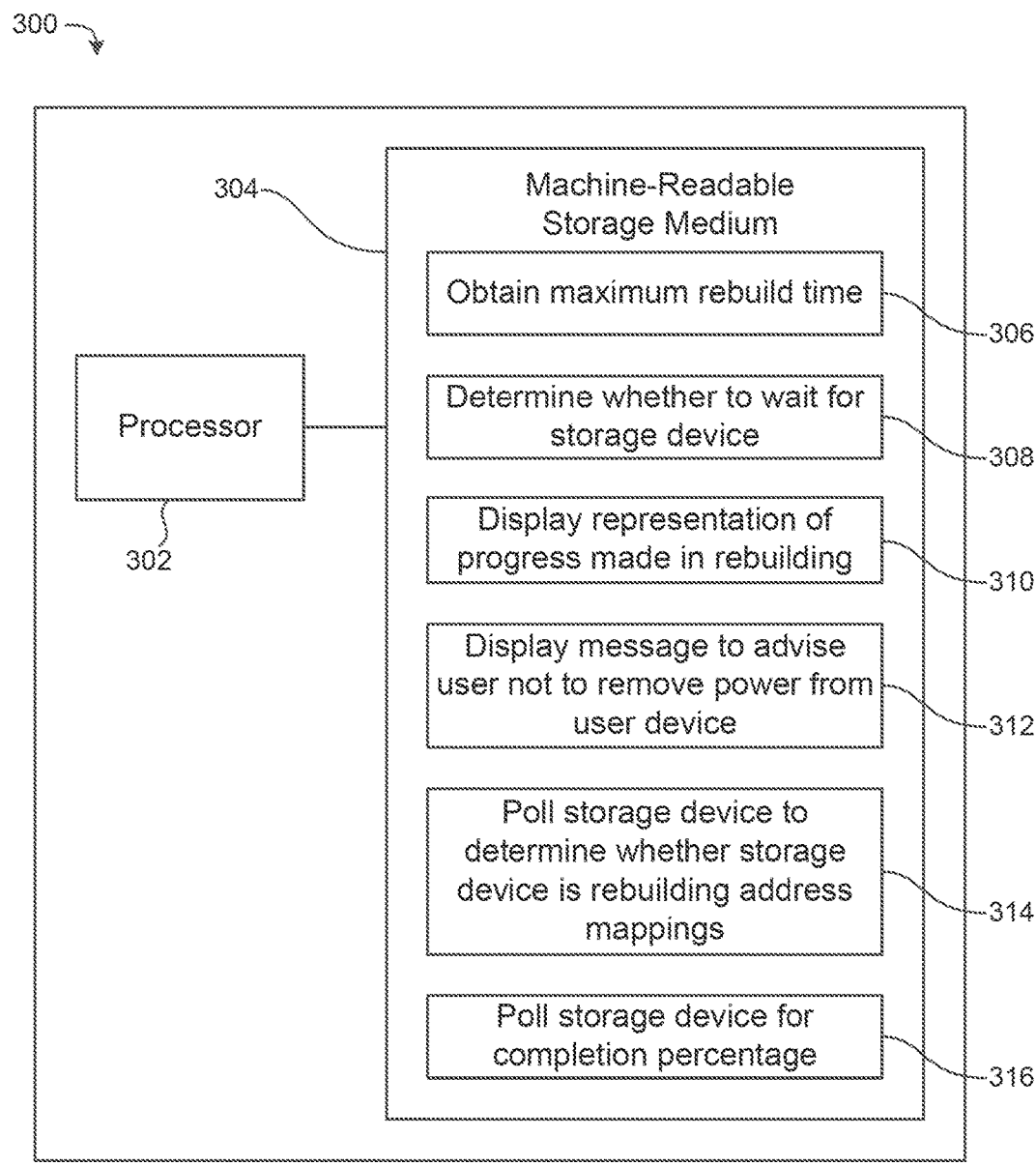
FIG. 3 is a block diagram of an example user device that includes a machine-readable storage medium encoded with instructions to communicate with a user and a storage device regarding rebuilding.

FIG. 3 is a block diagram of an example user device 300 that includes a machine-readable storage medium encoded with instructions to communicate with a user and a storage device regarding rebuilding. User device 300 may be a notebook computer, a desktop computer, a workstation, a tablet computing device, a mobile phone, or an electronic book reader. In some implementations, user device 300 may operate as and/or be part of a server. In FIG. 3, user device 300 includes processor 302 and machine-readable storage medium 304.

As with processor 102 of FIG. 1, processor 302 may include a CPU, microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, 310, 312, 314, and 316 to enable communication with a user and a storage device, in or communicatively coupled to user device 300, regarding rebuilding of the storage device, as described below. As an alternative or in addition to retrieving and/or executing instructions, processor 302 may include an electronic circuit comprising a number of electronic components for performing the functionality of instructions 306, 308, 310, 312, 314, and/or 316.

As with machine-readable storage medium 104 of FIG. 1, machine-readable storage medium 304 may be any suitable physical memory that stores executable instructions. Instructions 306, 308, and 310 on machine-readable storage medium 304 may be analogous to instructions 106, 108, and 110 on machine-readable storage medium 104. Instructions 312 may display a message to advise a user not to remove power from user device 300. The message may be displayed while a storage device that is part of or communicatively coupled to user device 300 is rebuilding, to discourage the user from turning off user device 300 upon discovering that he/she may have to wait to use user device 300. If power is removed from user device 300 during rebuilding, the rebuilding may be interrupted and any reconstructed mappings may be lost once again.

Instructions 314 may poll a storage device that is in or communicatively coupled to user device 300 to determine whether the storage device is rebuilding address mappings. The storage device may have a rebuild indicator bit that is set when the storage device is in a rebuild state. For example, a rebuild indicator bit may have a value of logical '0' when the storage device is not rebuilding, and may be set to a value of logical '1' when the storage device is rebuilding, or vice-versa. The storage device may transmit the rebuild indicator bit with other identification data when commanded to identify itself (e.g., by a BIOS of user device 300 during a boot-up process of user device 300), or in response to an explicit query to determine whether the storage device is rebuilding. In some implementations, the storage device may transmit additional bits with a rebuild indicator bit to qualify the validity of the rebuild indicator bit. For example, two additional bits may be transmitted with the rebuild indicator bit, and if the two additional bits do not have the same value as the rebuild indicator bit, the value of the rebuild indicator bit may not be considered to be meaningful. The transmission of additional bits may serve as a backwards compatibility guard to prevent the misinterpretation of "garbage" data in the storage device.

Instructions 316 may poll the storage device, while the storage device is rebuilding, for a completion percentage indicative of what percentage of the rebuilding is complete. In some implementations, the storage device may transmit a completion percentage with a rebuild indicator bit. A representation (e.g., graphical, textual, or both) of the completion percentage may be displayed on user device 300. In implementations where the storage device responds during rebuilding to some commands from a BIOS of user device 300, the storage device may be polled periodically for a completion percentage while the storage device is in a rebuild state. The displayed representation of the completion percentage may be periodically updated to reflect the most recent completion percentage received from the storage device.

Figure 4:
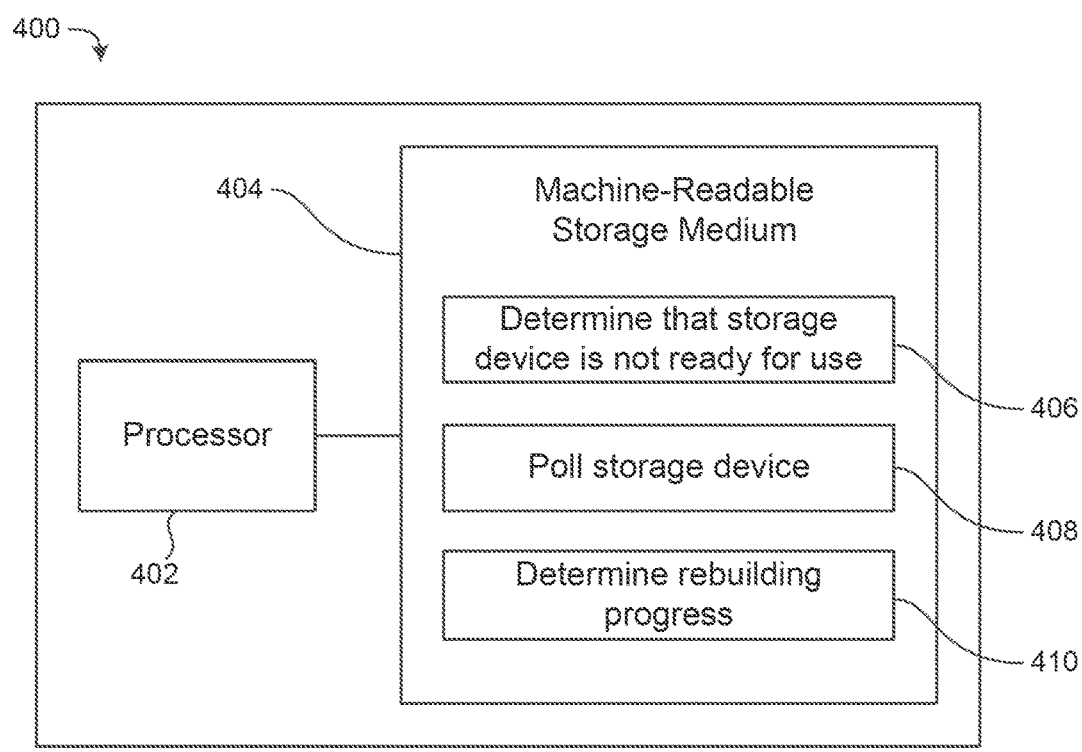
FIG. 4 is a block diagram of an example user device that includes a machine-readable storage medium encoded with instructions that enable obtaining information about a state of a storage device.

FIG. 4 is a block diagram of an example user device 400 that includes a machine-readable storage medium encoded with instructions that enable obtaining information about a state of a storage device. User device 400 may be a notebook computer, a desktop computer, a workstation, a tablet computing device, a mobile phone, or an electronic book reader. In some implementations, user device 400 may operate as and/or be part of a server. In FIG. 4, user device 400 includes processor 402 and machine-readable storage medium 404.

As with processor 102 of FIG. 1, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, and 410 to enable obtaining information about a state of a storage device in or communicatively coupled to user device 400, as described below. As an alternative or in addition to retrieving and/or executing instructions, processor 402 may include an electronic circuit comprising a number of electronic components for performing the functionality of instructions 406, 408, and/or 410.

As with machine-readable storage medium 104 of FIG. 1, machine-readable storage medium 404 may be any suitable physical memory that stores executable instructions. In some implementations, machine-readable storage medium 404 may include a non-transitory storage medium. As described in detail below, machine-readable storage medium 404 may be encoded with a set of executable instructions 406, 408, and 410.

Instructions 406 may determine that a storage device that is in or communicatively coupled to user device 400 is not ready for use. The determination may be made during POST of user device 400. The storage device may not be ready for use because it is rebuilding. A determination that the storage device is not ready for use may be made, for example, if the storage device does not respond to a command after a certain period of time, or if a rebuild indicator bit in the storage device is set, as discussed above with respect to FIG. 3. In some implementations, a link (e.g., Serial Advanced Technology Attachment [SATA] link) between the user device and storage device may be established, but the storage device may not be ready to accept certain commands (e.g., ATA commands) from the storage device. In such implementations, the storage device may have a "busy" status bit set to indicate that the storage device is not ready for certain commands (e.g., the status bit may have a value of logical '0' when the storage device is ready for all commands, and may be set to a value of logical '1' when the storage device is not ready for certain commands, or vice-versa).

Instructions 408 may poll a storage device for information related to rebuilding address mappings on the storage device. The information related to rebuilding address mappings may include a maximum rebuild time, an indication (e.g., rebuild indicator bit) that the storage device is rebuilding address mappings, a number representing how much progress has been made in the rebuilding, and/or an estimate of how much longer the rebuilding will take. In some implementations, the storage device may be polled for its maximum rebuild time while the storage device is not rebuilding (e.g., during normal operation of the storage device). The maximum rebuild time may be stored in a non-volatile memory, as discussed above with respect to FIG. 2. In some implementations, the storage device may be polled for information while the storage device is rebuilding, and the information related to rebuilding address mappings may include a completion percentage indicative of what percentage of the rebuilding is complete.

Instructions 410 may determine, based on information related to rebuilding address mappings that is received from a storage device, how much progress has been made in the rebuilding. In some implementations, instructions 410 may identify, within the information received from the storage device, a completion percentage or other indicator of how far along the rebuilding process is. In some implementations, the storage device may not respond to commands (e.g., polling) while rebuilding, and instructions 410 may estimate how much progress has been made in the rebuilding. For example, instructions 410 may divide a value of a rebuild timer by a maximum rebuild time obtained from the storage device during normal operation, as discussed above with respect to FIG. 2.

Figure 5:
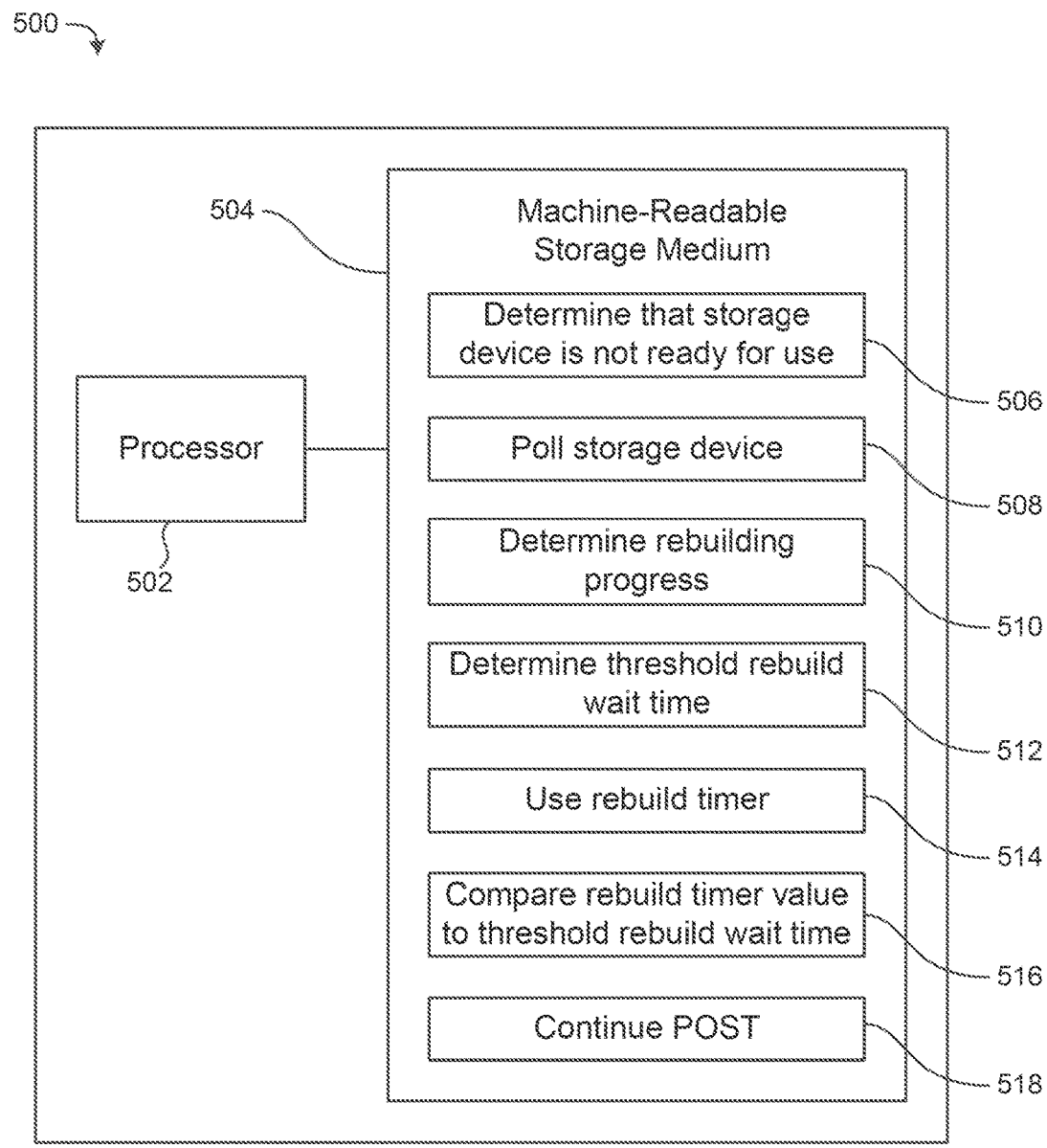
FIG. 5 is a block diagram of an example user device that includes a machine-readable storage medium encoded with instructions to use a threshold rebuild wait time to determine whether to continue power-on self-test of the user device.

FIG. 5 is a block diagram of an example user device 500 that includes a machine-readable storage medium encoded with instructions to use a threshold rebuild wait time to determine whether to continue POST of the user device. User device 500 may be a notebook computer, a desktop computer, a workstation, a tablet computing device, a mobile phone, or an electronic book reader. In some implementations, user device 500 may operate as and/or be part of a server. In FIG. 5, user device 500 includes processor 502 and machine-readable storage medium 504.

As with processor 402 of FIG. 4, processor 502 may include a CPU, microprocessor (e.g., semiconductor-based microprocessor), and/or other hardware device suitable for retrieval and/or execution of instructions stored in machine-readable storage medium 504. Processor 502 may fetch, decode, and/or execute instructions 506, 508, 510, 512, 514, 516, and 518 to enable use of a threshold rebuild wait time to determine whether to continue POST of user device 500, which may be include or be communicatively coupled to a storage device, as described below. As an alternative or in addition to retrieving and/or executing instructions, processor 502 may include an electronic circuit comprising a number of electronic components for performing the functionality of instructions 506, 508, 510, 512, 514, 516, and/or 518.

As with machine-readable storage medium 404 of FIG. 4, machine-readable storage medium 504 may be any suitable physical memory that stores executable instructions. Instructions 506, 508, and 510 on machine-readable storage medium 504 may be analogous to instructions 406, 408, and 410 on machine-readable storage medium 404. Instructions 512 may determine a threshold rebuild wait time based on a maximum rebuild time received from a storage device. The threshold rebuild wait time may be a maximum amount of time that user device 500 will wait for the storage device to become available before continuing with POST. A BIOS of user device 500 may suspend POST upon determining that the storage device is not available, but if the storage device is still not available after an amount of time equal to the threshold rebuild wait time has elapsed, POST may continue despite the storage device's unavailability. In some implementations, the threshold rebuild wait time may be the maximum rebuild time of the storage device. In some implementations, the threshold rebuild wait time may be longer than the maximum rebuild time by a specified amount of time (e.g., threshold rebuild wait time may be 30 seconds longer than maximum rebuild time) or by a percentage of the maximum rebuild time (e.g., threshold rebuild wait time may be maximum rebuild time plus 10% of maximum rebuild time).

Instructions 514 may use a rebuild timer to keep track of how long a storage device that is in or communicatively coupled to user device 500 has been rebuilding address mappings. Instructions 514 may start the rebuild timer after determining that the storage device is not ready for use. The rebuild timer may run until the threshold rebuild wait time has elapsed, or until the storage device is finished rebuilding, whichever comes first.

Instructions 516 may compare a value of the rebuild timer to the threshold rebuild wait time. For example, instructions 516 may input the current value of the rebuild timer and the threshold rebuild wait time into a comparator. If the value of the rebuild timer is less than the threshold rebuild wait time, POST of user device 500 may be suspended or delayed. If the value of the rebuild timer exceeds the threshold rebuild wait time, instructions 518 may continue POST of user device 500 without waiting for the storage device to finish rebuilding. In some implementations, instructions 518 may continue POST of user device 500 if the value of the rebuild time equals the threshold rebuild wait time.

Figure 6:
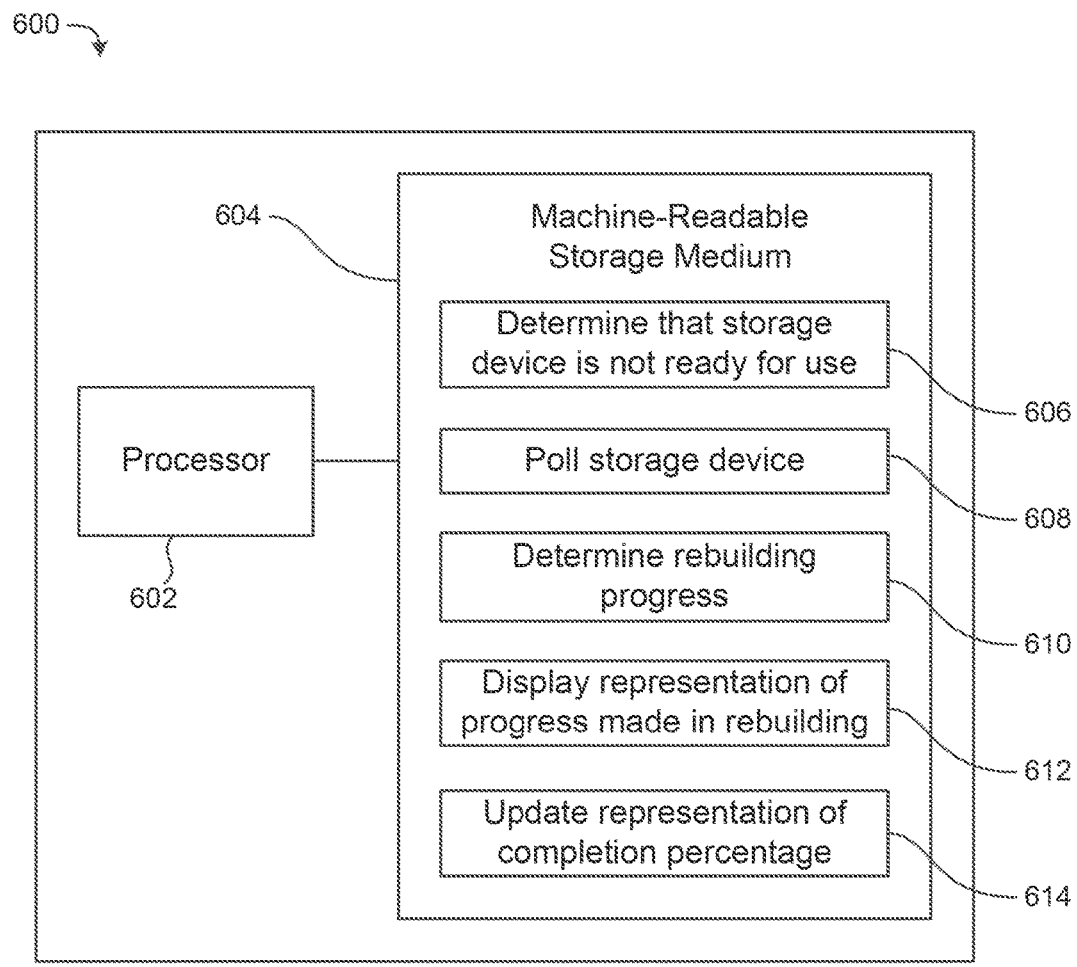
FIG. 6 is a block diagram of an example user device that includes a machine-readable storage medium encoded with instructions to enable displaying a representation of rebuild progress of a storage device.

FIG. 6 is a block diagram of an example user device 600 that includes a machine-readable storage medium encoded with instructions to enable displaying a representation of rebuild progress of a storage device. User device 600 may be a notebook computer, a desktop computer, a workstation, a tablet computing device, a mobile phone, or an electronic book reader. In some implementations, user device 600 may operate as and/or be part of a server. In FIG. 6, user device 600 includes processor 602 and machine-readable storage medium 604.

As with processor 402 of FIG. 4, processor 602 may include a CPU, microprocessor (e.g., semiconductor-based microprocessor), and/or other hardware device suitable for retrieval and/or execution of instructions stored in machine-readable storage medium 604. Processor 602 may fetch, decode, and/or execute instructions 606, 608, 610, 612, and 614 to enable displaying a representation of rebuild progress of a storage device in or communicatively coupled to user device 600, as described below. As an alternative or in addition to retrieving and/or executing instructions, processor 602 may include an electronic circuit comprising a number of electronic components for performing the functionality of instructions 606, 608, 610, 612, and/or 614.

As with machine-readable storage medium 404 of FIG. 4, machine-readable storage medium 604 may be any suitable physical memory that stores executable instructions. Instructions 606, 608, and 610 on machine-readable storage medium 604 may be analogous to instructions 406, 408, and 410 on machine-readable storage medium 404. Instructions 612 may display a representation of progress made in rebuilding of a storage device that is part of or communicatively coupled to user device 600. The representation of progress may be graphical, textual, or a combination thereof. In some implementations, a representation of a completion percentage indicative of what percentage of the rebuilding is complete may be displayed. For example, a displayed horizontal or vertical bar, or circle, may be shaded based on what percentage of the rebuilding is complete. In some implementations, a number corresponding to the completion percentage may be displayed instead of or in addition to a graphical representation of the completion percentage. Textual messages may also be displayed to inform a user of user device 600 that rebuilding is in progress, and/or to advise the user not to remove power from the user device.

Instructions 614 may update a displayed representation of a completion percentage as updated completion percentage values are received. A storage device in or communicatively coupled to user device 600 may respond to some commands while rebuilding, and instructions 608 may periodically poll the storage device for and receive updated completion percentage values while the storage device is in a rebuild state. The displayed representation of the completion percentage may be periodically updated to reflect the most recent completion percentage value received from the storage device.

Figure 7:
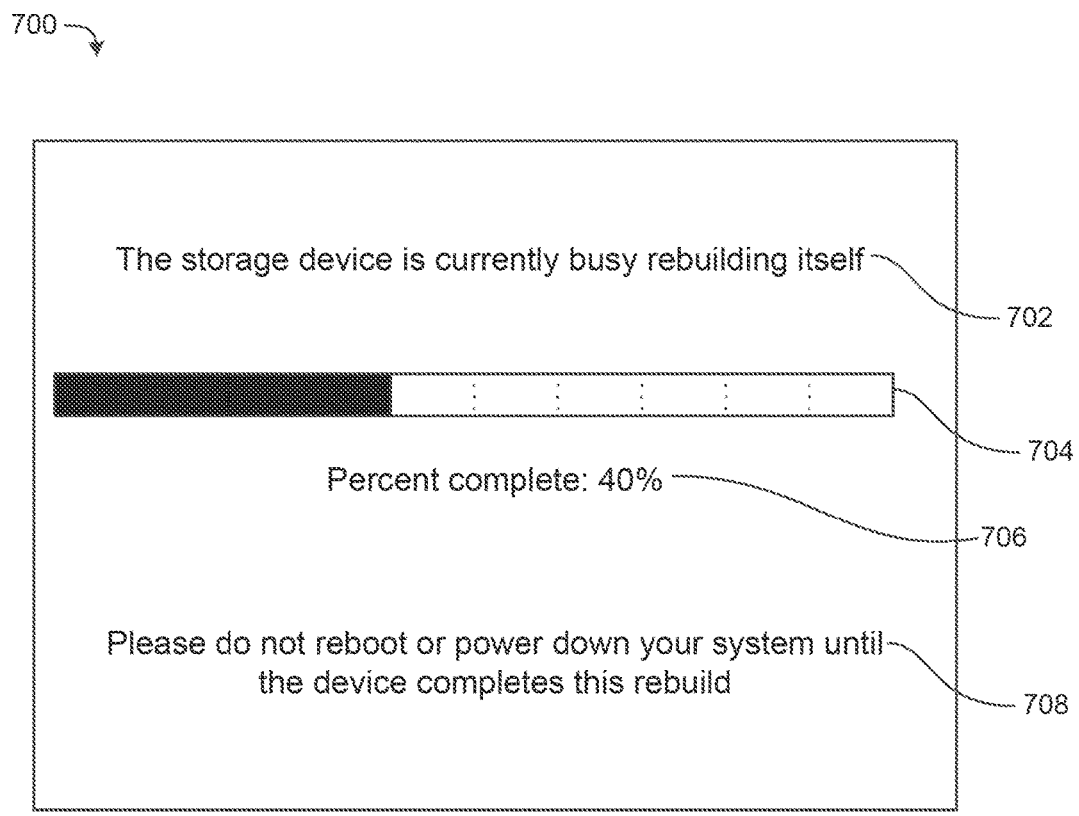
FIG. 7 is an example rebuilding screen that may displayed on a user device while a storage device in or communicatively coupled to the user device is in a rebuild state.

FIG. 7 is an example rebuilding screen 700 that may displayed on a user device while a storage device in or communicatively coupled to the user device is in a rebuild state. Rebuilding screen 700 may be displayed, for example, on user device 100 or 600 when instructions 110 or 612, respectively, are executed. Rebuilding screen 700 may include a message 702 to indicate to a user why the storage device is not available. Rebuilding screen 700 may include graphical progress indicator 704, which may be shaded to indicate how much progress has been made in the rebuilding of the storage device. In some implementations, graphical progress indicator 704 may be shaded based on a completion percentage received from the storage device. In some implementations, graphical progress indicator 704 may be shaded based on an estimated completion percentage, as discussed above with respect to FIG. 2.

In FIG. 7, graphical progress indicator 704 may be a horizontal bar that is 40% shaded to indicate that the rebuilding process is (or is estimated to be) 40% complete. Graphical progress indicator 704 may be periodically updated (e.g., the amount of shading may increase) as the user device receives updated completion percentage values from the storage device, as discussed above with respect to FIG. 6, or as time elapses and the estimated completion percentage increases, as discussed above with respect to FIG. 2. Graphical progress indicator 704 may have hash marks so that a user can easily tell what percentage of the indicator is shaded. Although graphical progress indicator 704 is shown as a horizontal bar in FIG. 7, it should be understood that other suitable shapes (e.g., vertical bar, circle) may be used.

In some implementations, rebuilding screen 700 may include textual progress indicator 706 to show the numerical value of the rebuild completion percentage. Textual progress indicator 706 may be especially useful when the shading of graphical progress indicator 704 stops between hash marks. Although both graphical progress indicator 704 and textual progress indicator 706 are shown in rebuilding screen 700, it should be understood that some rebuilding screens may have one of the progress indicator types and not the other. In some implementations, rebuilding screen 700 may include a message 708 to advise a user of the user device not to remove power from the user device.

Figure 8:
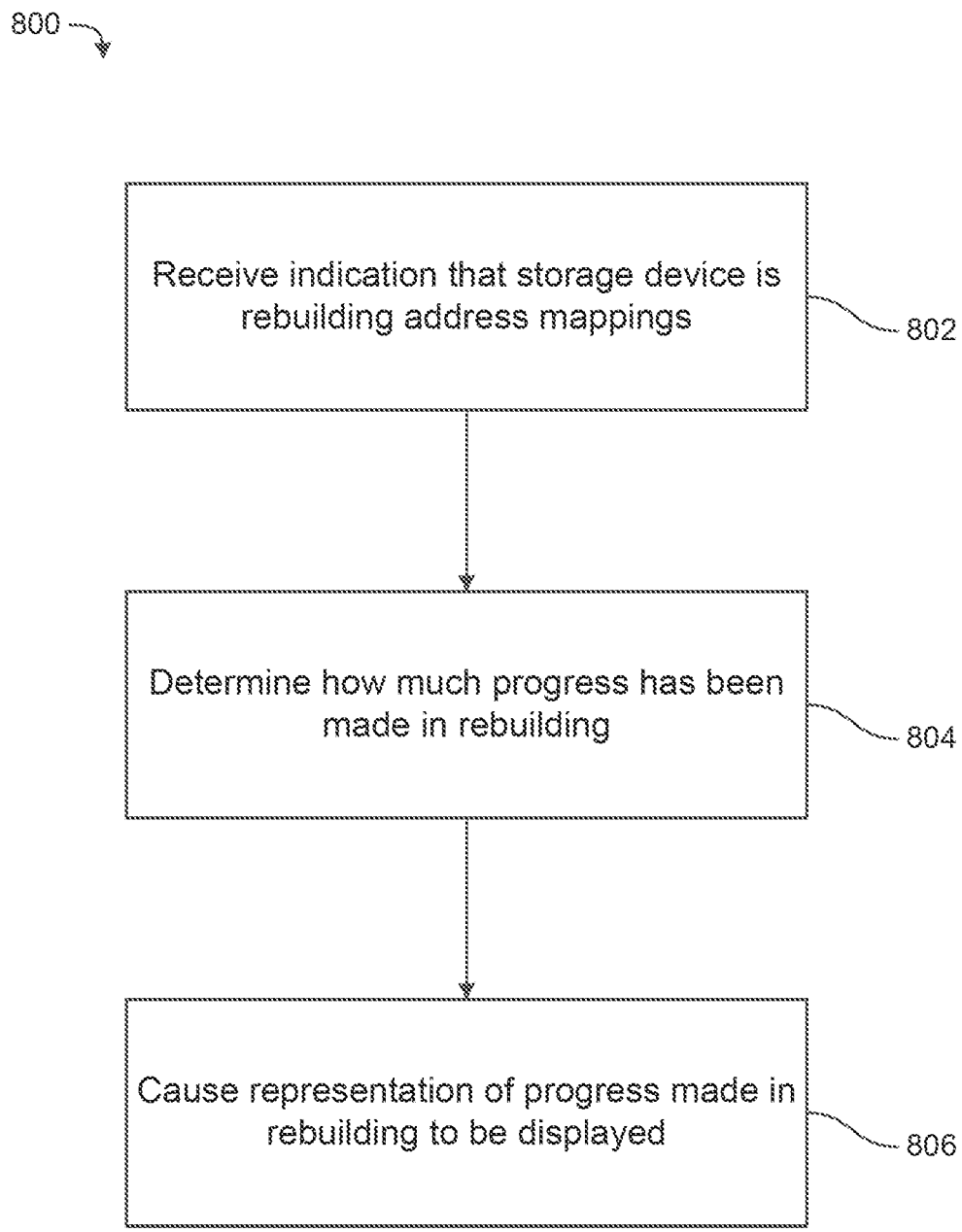
FIG. 8 is a flowchart of an example method for indicating a rebuild state of a storage device.
Figure 9:
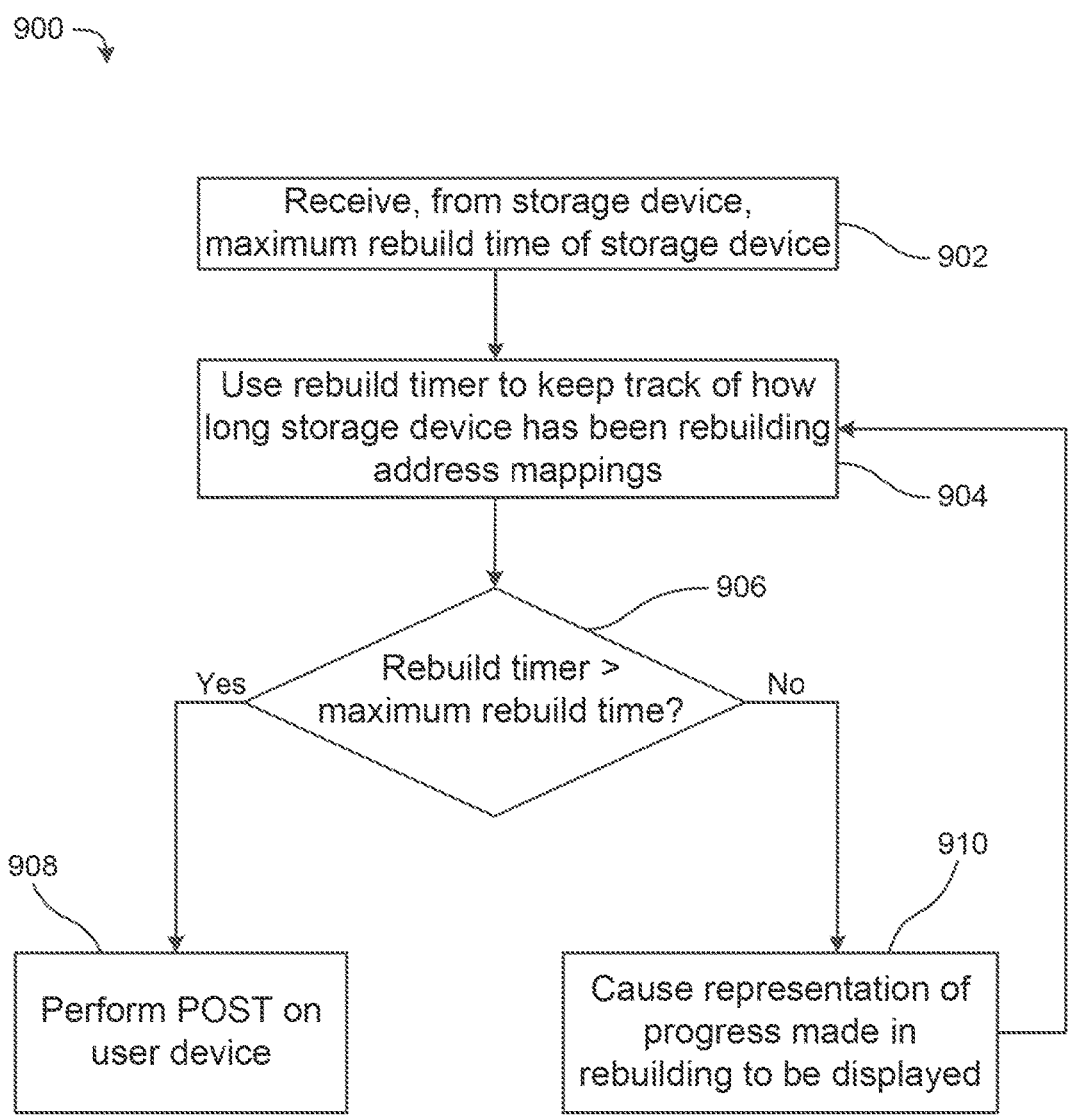
FIG. 9 is a flowchart of an example method for determining whether to continue power-on self-test of a user device when a storage device in or communicatively coupled to the user device is in a rebuild state.
Figure 10:
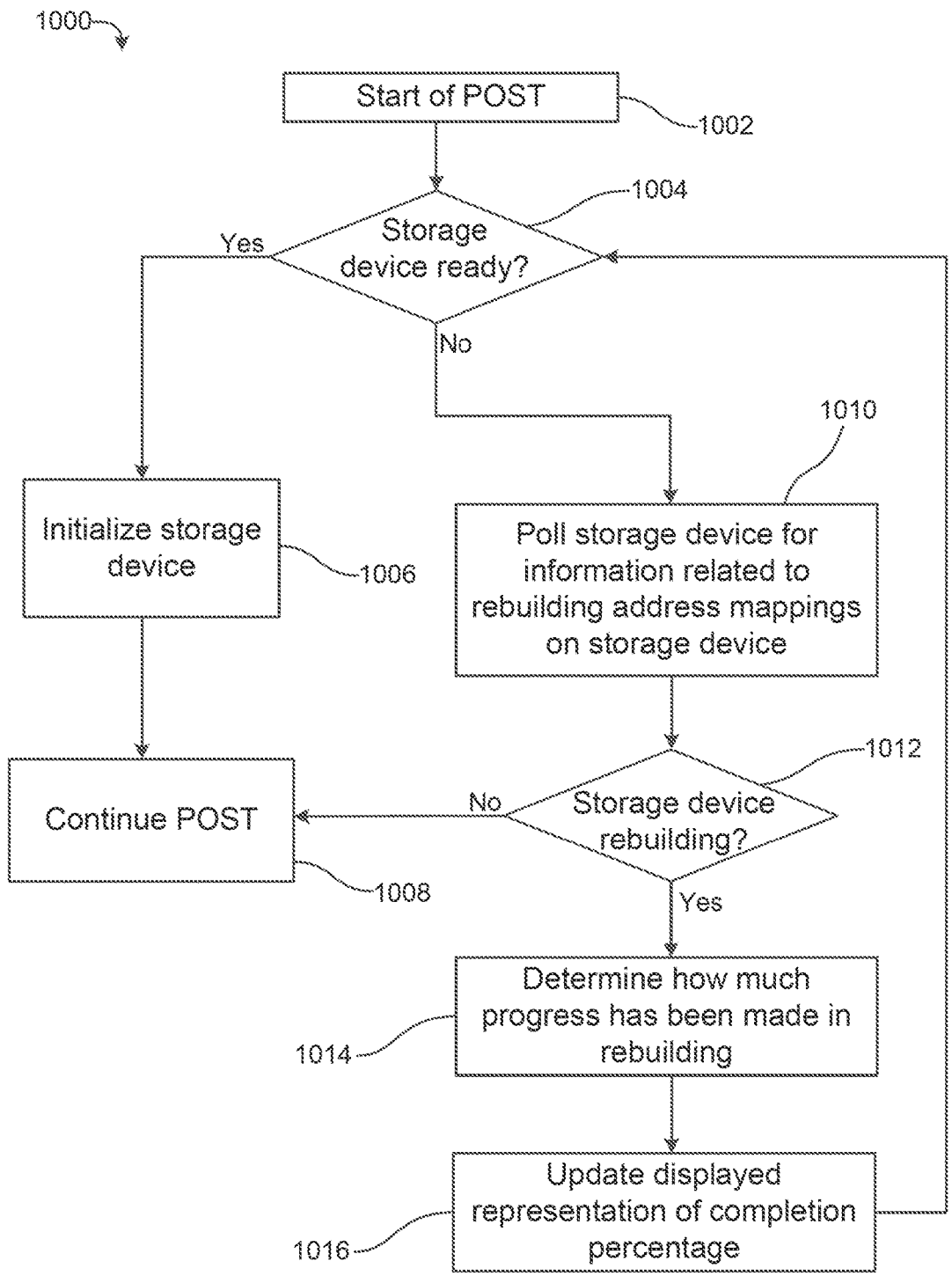
FIG. 10 is a flowchart of an example method for displaying a representation of rebuild progress of a storage device.

Methods related to actions performed when a storage device is rebuilding are discussed with respect to FIGS. 8-10. FIG. 8 is a flowchart of an example method 800 for indicating a rebuild state of a storage device. Although execution of method 800 is described below with reference to processor 602 of FIG. 6, it should be understood that execution of method 800 may be performed by other suitable devices, such as processor 402 of FIG. 4. Method 800 may be implemented in the form of executable instructions stored on a machine-readable storage medium and/or in the form of electronic circuitry.

Method 800 may start in block 802, where processor 602 may receive an indication that a storage device is rebuilding address mappings. The address mappings may be rebuilt based on metadata stored in the storage device, and may include mappings of logical addresses to physical addresses in the storage device. In some implementations, processor 602 may receive a rebuild indicator bit from the storage device while the storage device is rebuilding. The rebuild indicator bit may be set to a value of logical '1' to indicate that the storage device is rebuilding. In some implementations, the storage device may transmit additional bits with a rebuild indicator bit to qualify the validity of the rebuild indicator bit, as discussed above with respect to FIG. 3.

Next, in block 804, processor 602 may determine how much progress has been made in the rebuilding. In some implementations, processor 602 may periodically poll the storage device and receive, from the storage device, information regarding the status of the rebuilding. The received information may include a completion percentage or other indicator of how far along the rebuilding process is. The completion percentage may be indicative of what percentage of the rebuilding is complete.

Finally, in block 806, processor 602 may cause a representation of progress made in the rebuilding to be displayed. The displayed representation may include a representation of the completion percentage. The displayed representation may be graphical, textual, or both, as discussed above with respect to FIG. 1. An example of a representation of progress that may be displayed is shown in FIG. 7. In some implementations, textual messages may also be displayed to inform a user of user device 600 that rebuilding is in progress, and/or to advise the user not to remove power from the user device.

FIG. 9 is a flowchart of an example method 900 for determining whether to continue POST of a user device when a storage device in or communicatively coupled to the user device is in a rebuild state. Although execution of method 900 is described below with reference to processor 502 of FIG. 5, it should be understood that execution of method 900 may be performed by other suitable devices, such as processors 202 and 402 of FIGS. 2 and 4, respectively. Some blocks of method 900 may be performed in parallel with and/or after method 800. Method 900 may be implemented in the form of executable instructions stored on a machine-readable storage medium and/or in the form of electronic circuitry.

Method 900 may start in block 902, where processor 502 may receive, from a storage device, a maximum rebuild time of the storage device. In some implementations, processor 502 may receive the maximum rebuild time with the storage device's self-identification information. In some implementations, processor 502 may receive the maximum rebuild time with other information (e.g., completion percentage) related to rebuilding address mappings.

Next, in block 904, processor 502 may use a rebuild timer to keep track of how long the storage device has been rebuilding address mappings. Processor 502 may start the rebuild timer after determining that the storage device is not available and/or after receiving an indication that the storage device is rebuilding. The rebuild timer may run until the maximum rebuild time is reached, or until the storage device is finished rebuilding, whichever comes first.

In block 906, processor 502 may determine whether the value of the rebuild timer exceeds the maximum rebuild time. If so, method 900 may proceed to block 908, in which processor 502 may perform POST on user device 500 without waiting for the storage device to finish rebuilding. In some implementations, method 900 may proceed to block 908 if the value of the rebuild timer equals the maximum rebuild time.

If, in block 906, it is determined that the value of the rebuild timer is not greater than the maximum rebuild time, method 900 may proceed to block 910, in which processor 502 may cause a representation of the progress made in rebuilding to be displayed. The displayed representation may include a representation of a completion percentage indicative of what percentage of the rebuilding is complete. The displayed representation may be graphical, textual, or both, as discussed above with respect to FIG. 1. An example of a representation of progress that may be displayed is shown in FIG. 7. In some implementations, textual messages may also be displayed to inform a user of user device 500 that rebuilding is in progress, and/or to advise the user not to remove power from the user device. From block 910, method 900 may loop back to block 904. In implementations where the storage device responds to some commands while rebuilding (e.g., implementations where processor 502 receives the maximum rebuild time and a completion percentage from the storage device during rebuilding), method 900 may loop back to block 902 from block 910.

FIG. 10 is a flowchart of an example method 1000 for displaying a representation of rebuild progress of a storage device. Although execution of method 1000 is described below with reference to processor 602 of FIG. 6, it should be understood that execution of method 1000 may be performed by other suitable devices, such as processors 302 and 402 of FIGS. 3 and 4, respectively. Some blocks of method 1000 may be performed in parallel with and/or after methods 800 and/or 900. Method 1000 may be implemented in the form of executable instructions stored on a machine-readable storage medium and/or in the form of electronic circuitry.

Method 1000 may start in block 1002, where processor 602 may start POST on user device 600. Next, in block 1004, processor 602 may determine whether a storage device that is part of or communicatively coupled to the user device is ready (e.g., available for normal operations/use). If so, method 1000 may proceed to block 1006, in which the storage device may be initialized. Then, at block 1008, processor 602 may continue POST on user device 600.

If, in block 1004, it is determined that the storage device is not ready, method 1000 may proceed to block 1010, in which processor 602 may poll the storage device for information related to rebuilding address mappings on the storage device. The information related to rebuilding address mappings may include an indication of whether the storage device is rebuilding address mappings. For example, the information related to rebuilding address mappings may include a rebuild indicator bit that may have a value of logical '0' when the storage device is not rebuilding and a value of logical '1' when the storage device is rebuilding, or vice-versa, as discussed above with respect to FIG. 3. In some implementations, the information related to rebuilding address mappings may also include a maximum rebuild time and/or a completion percentage indicative of what percentage of rebuilding is complete.

Next, in block 1012, processor 602 may determine whether the storage device is rebuilding. For example, processor 602 may identify and determine the value of a received rebuild indicator bit. If it is determined that the storage device is not rebuilding (e.g., if the rebuild indicator bit has a value of logical '0'), method 1000 may proceed to block 1008.

If, in block 1012, it is determined that the storage device is rebuilding (e.g., if the rebuild indicator bit has a value of logical '1'), method 1000 may proceed to block 1014, in which processor 602 may determine how much progress has been made in the rebuilding. For example, processor 602 may identify, among received information related to rebuilding address mappings, a completion percentage or other indicator of how far along the rebuilding process is. The completion percentage may be indicative of what percentage of the rebuilding is complete.

In block 1016, processor 602 may update a displayed representation of the completion percentage to reflect the value of the most recently received completion percentage. The displayed representation may be graphical, textual, or both, as discussed above with respect to FIG. 1. Method 1000 may then loop back to block 1004. In some implementations, processor 602 may wait for a specified period of time before looping back to block 1004.

The foregoing disclosure describes indicating a rebuild state of storage devices. Example implementations described herein enable providing a user with a reason for why a storage device is unavailable and updates on rebuilding progress.

We claim:

1. A method comprising:
in response to a power-on self-test (POST) of a computing device:
receiving, in the computing device, an indication that a storage device is rebuilding address mappings between first addresses and second addresses;
determining, by the computing device, an amount of progress made in the rebuilding;
controlling, by machine-readable instructions executed in the computing device, the POST of the computing device based on the determined amount of progress made in the rebuilding, wherein controlling the POST based on the determined amount of progress made in the rebuilding comprises:
suspending the POST in response to an amount of time spent in performing the rebuilding not exceeding a time threshold, and
continuing the POST in response to the amount of time spent in performing the rebuilding exceeding the time threshold; and
causing, by the computing device, displaying a representation of the amount of progress made in the rebuilding.

2. The method of claim 1, comprising rebuilding the address mappings based on metadata stored in the storage device, wherein the address mappings comprise mappings of logical addresses to physical addresses in the storage device.

3. The method of claim 1, wherein:
determining the amount of progress made in the rebuilding comprises receiving, from the storage device, a completion percentage indicative of what percentage of the rebuilding is complete; and
the displayed representation comprises a representation of the completion percentage.

4. The method of claim 1, further comprising:
receiving, from the storage device, a maximum rebuild time of the storage device, wherein the time threshold is the maximum rebuild time;
using a rebuild timer to keep track of how long the storage device has been rebuilding the address mappings;
comparing a value of the rebuild timer to the maximum rebuild time; and
in response to the value of the rebuild timer exceeding the maximum rebuild time, continuing the POST without waiting for the storage device to finish the rebuilding.

5. A non-transitory machine-readable storage medium encoded with instructions that upon execution cause a computing device comprising a processor to:
obtain, from a storage device, a maximum rebuild time;
store the maximum rebuild time in a non-volatile memory;
retrieve, from the non-volatile memory, the maximum rebuild time;
determine an amount of time spent on rebuilding address mappings between first addresses and second addresses, the determining comprising using a rebuild timer to keep track of the amount of time spent by the storage device on rebuilding the address mappings;
control an operation of the computing device based on the determined amount of time spent on rebuilding the address mappings and based on the maximum rebuild time;
divide a value of the rebuild timer by the maximum rebuild time to estimate what percentage of the rebuilding is complete; and
display a representation of progress made in the rebuilding, the representation including the estimated percentage.

6. The non-transitory machine-readable storage medium of claim 5, wherein displaying the representation comprises displaying a graphical illustration of the estimated percentage.

7. The non-transitory machine-readable storage medium of claim 5, wherein the instructions upon execution cause the computing device to display a message to advise a user of the computing device not to remove power from the computing device.

8. The non-transitory machine-readable storage medium of claim 5, wherein the instructions upon execution cause the computing device to poll the storage device to determine whether the storage device is rebuilding the address mappings.

9. The non-transitory machine-readable storage medium of claim 5, wherein the obtaining, the determining, the controlling, and the displaying are performed in response to a power-on self-test (POST) of the computing device, and wherein the controlling of the operation of the computing device comprises controlling the POST based on the determined amount of time spent on the rebuilding.

10. The non-transitory machine-readable storage medium of claim 9, wherein controlling the POST based on the determined amount of time spent on the rebuilding comprises:
suspending the POST in response to the amount of time spent on the rebuilding not exceeding a time threshold, and
continuing the POST in response to the amount of time spent on the rebuilding exceeding the time threshold.

11. A computing device comprising:
a processor; and
a non-transitory storage medium storing instructions executable on the processor to:
determine, during a power-on self-test (POST) of the computing device, that a storage device is not ready for use by the computing device;
poll the storage device for information related to rebuilding address mappings between first addresses and second addresses on the storage device;
determine, based on information related to the rebuilding of the address mappings that is received from the storage device, an amount of progress made in the rebuilding; and
control the POST based on the determined amount of progress made in the rebuilding, wherein the controlling of the POST based on the determined amount of progress made in the rebuilding comprises:
suspending the POST in response to an amount of time spent in performing the rebuilding not exceeding a time threshold, and
continuing the POST in response to the amount of time spent in performing the rebuilding exceeding the time threshold.

12. The computing device of claim 11, wherein the information related to rebuilding of the address mappings on the storage device comprises a maximum rebuild time and an indication that the storage device is rebuilding the address mappings, the instructions executable on the processor to:
- determine the time threshold based on the maximum rebuild time;
- use a rebuild timer to keep track of how long the storage device has been rebuilding the address mappings;
- compare a value of the rebuild timer to the time threshold; and
- continue the POST in response to the value of the rebuild timer exceeding the time threshold, without waiting for the storage device to finish the rebuilding.

13. The computing of claim 11, wherein the instructions are executable on the processor to display a representation of the amount of progress made in the rebuilding.

14. The computing device of claim 13, wherein the instructions are executable on the processor to:
- periodically receive, from the storage device, updated completion percentage values of the rebuilding; and
- update the displayed representation of the amount of progress made in the rebuilding to reflect the updated completion percentage values.

15. The machine-readable storage medium of claim 11, wherein the rebuilding of the address mappings comprises rebuilding addresses mappings between logical addresses and physical addresses of the storage device.

\* \* \* \* \*

UNITED STATES PATENT AND TRADEMARK OFFICE
CERTIFICATE OF CORRECTION

PATENT NO.         : 10,146,623 B2
APPLICATION NO.    : 15/035483
DATED              : December 4, 2018
INVENTOR(S)        : Byron A. Alcorn et al.

Page 1 of 1

It is certified that error appears in the above-identified patent and that said Letters Patent is hereby corrected as shown below:

In the Claims

Column 15, Line 13, Claim 13, after "computing" insert -- device --.

Signed and Sealed this
Twenty-sixth Day of March, 2019

Andrei Iancu
*Director of the United States Patent and Trademark Office*